Figure 1:
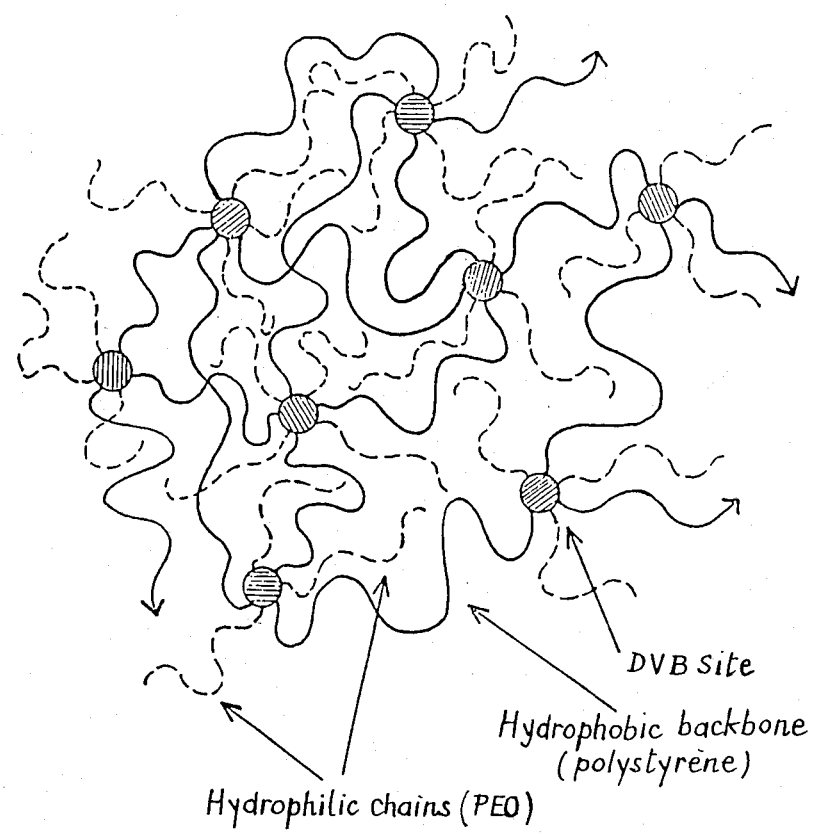

United States Patent [19]

Chaumont et al.

[11] Patent Number: 4,687,814
[45] Date of Patent: Aug. 18, 1987

[54] PARTIALLY HYDROPHILIC, NON-IONIC CROSSLINKED COPOLYMERS AND THEIR APPLICATION TO SIZE EXCLUSION CHROMATOGRAPHY IN AQUEOUS MEDIA

[75] Inventors: Philippe Chaumont, La Wantzennau; Gérard Beinert, Strasbourg; Jean Herz, Barr; Paul Rempp, Strasbourg, all of France

[73] Assignee: Centre National de la Recherche Scientifique, Paris, France

[21] Appl. No.: 692,974

[22] Filed: Jan. 22, 1985

[30] Foreign Application Priority Data

Jan. 25, 1984 [FR] France ................................. 84 01146

[51] Int. Cl.$^4$ ................... C08F 257/02; C08F 297/02; C08F 8/00; C08G 65/02
[52] U.S. Cl. .................................. 525/242; 525/250; 525/271; 525/385; 525/304; 525/305; 525/308; 525/301
[58] Field of Search ................ 525/242, 305, 271, 250

[56] References Cited

U.S. PATENT DOCUMENTS 3,786,116  1/1974  Milkovich et al. ................. 525/242
4,280,923  7/1981  Small et al. .......................... 252/323
4,523,000  6/1985  Hatada et al. ....................... 525/250

FOREIGN PATENT DOCUMENTS 1399046  6/1975  United Kingdom .
1425870  2/1976  United Kingdom .
1429836  3/1976  United Kingdom .
2113226  8/1983  United Kingdom .

OTHER PUBLICATIONS

Chem. Abstract 95 37 (1981) No. 8218j.
Chem. Abstract 89 44 (1978) No. 89-6085g.

Primary Examiner—Carman J. Seccuro
Attorney, Agent, or Firm—Sherman and Shalloway

[57] ABSTRACT

The invention relates to partially hydrophilic, non-ionic crosslinked copolymers.

These copolymers consist of a crosslinked hydrophobic backbone having a high mechanical strength, and of non-ionic hydrophilic chains grafted selectively onto the backbone.

The copolymers are useful for size exclusion chromatography in an aqueous medium.

4 Claims, 3 Drawing Figures

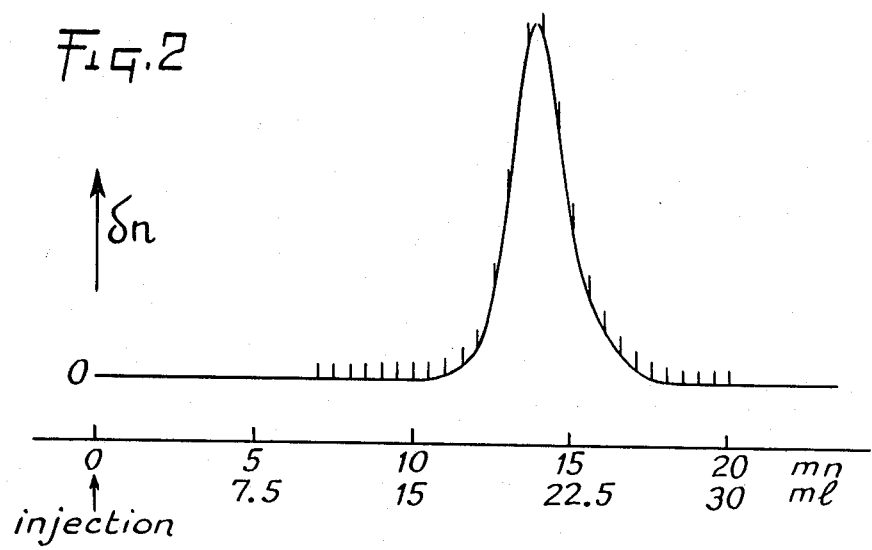
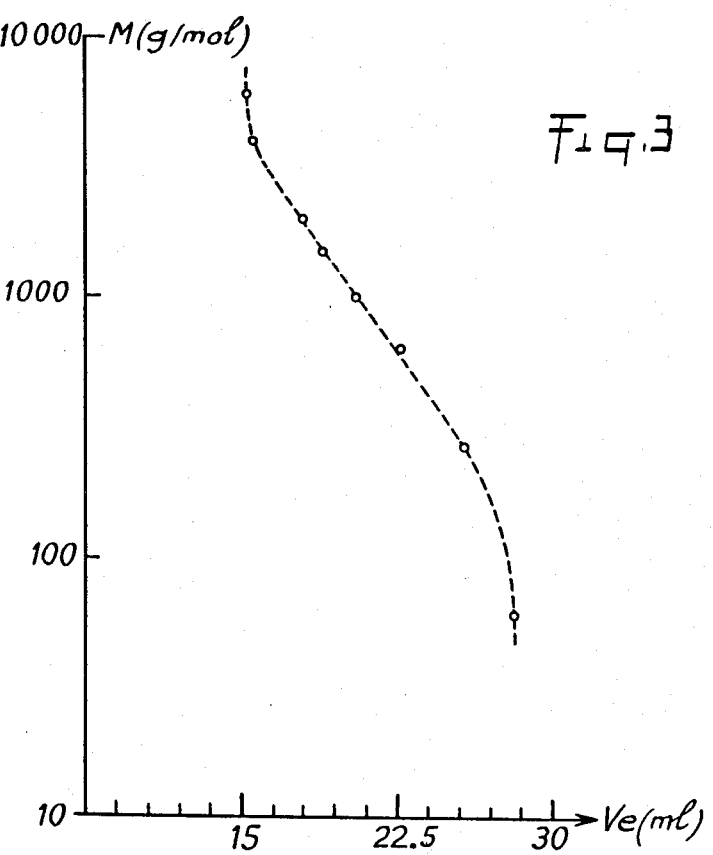

PARTIALLY HYDROPHILIC, NON-IONIC CROSSLINKED COPOLYMERS AND THEIR APPLICATION TO SIZE EXCLUSION CHROMATOGRAPHY IN AQUEOUS MEDIA

The present invention relates to partially hydrophilic, non-ionic copolymers having a three-dimensional network. It also relates to the application of these copolymers to liquid chromatography on a permeable gel in an aqueous medium (or size exclusion chromatography).

Size exclusion chromatography is a suitable technique for the characterization of polymeric substances.

In the majority of cases, the column fillings consist either of strongly crosslinked, macroporous styrene-divinylbenzene networks or of porous silica gels. The silica gels have to undergo chemical surface modifications in order to be used with organic solvents as eluents.

The above two types of filling are generally available in the form of microscopic spherical beads. They have a good mechanical strength in the presence of an eluent; even under high elution pressures, the pore volume of the column remains unchanged and well-defined for a given elution solvent.

Tetrahydrofuran, toluene and dimethylformamide are the most commonly used organic solvents in size exclusion chromatography. They wet the chromatographic filling and penetrate into the pores. They are successfully used to characterize organic polymers and copolymers.

There are polymers, however, which require the use of water as the eluent.

Liquid chromatography on a permeable gel in an aqueous medium is of great value for the study and characterization of water-soluble polymers. This very important class of macromolecular compounds includes both synthetic polymers and polysaccharides, proteins or other biopolymers.

The use of water as the elution solvent obviously needs a hydrophilic gel as the column filling. This gel must satisfy the following requirements:

It must have a sufficient affinity for water.

In the presence of water, it must have a large, readily accessible pore volume.

When "swollen" in water, it must have a good mechanical strength enabling it to withstand high pressures, for example of the order of 80 to 100 bar.

However, a lack of mechanical strength has very often been observed in the case of hydrophilic gels, such as crosslinked dextrans or agaroses, when high pressures are applied to them; this lack of strength often results in a decrease in the accessible pore volume and sometimes in clogging of the column. A phenomenon of this kind occurs especially when the pore dimensions of the gel are large. Such gels are used for the size exclusion chromatography of high molecular weight polymers. To overcome this disadvantage, attempts have been made to work with a low pressure, i.e. with reduced elution rates; the elution time is increased considerably as a consequence.

There is therefore a need for crosslinked copolymers which are both hydrophilic and strong under the conditions normally employed in liquid chromatography on a permeable gel in an aqueous medium.

New partially hydrophilic, non-ionic crosslinked copolymers have now been found which have a good mechanical strength, especially under the conditions corresponding to use in size exclusion chromatography in an aqueous medium.

The invention will now be described in greater detail by reference to preferred embodiments and with the aid of the following drawings in which FIG. 1 is a schematic representation of the macromolecular structure of the crosslinked hydrophobic backbone with nonionic hydrophilic chains grafted thereto;

FIG. 2 is an elution curve obtained using the copolymers of the present invention in the GPC apparatus; and FIG. 3 is a graft showing the molecular weight of eluent as a function of elution volume obtained with the crosslinked copolymers of the present invention.

The copolymers according to the invention are partially hydrophilic, non-ionic copolymers having a three-dimensional network, which consist of a hydrophobic backbone having a high mechanical strength, and of non-ionic hydrophilic chains grafted selectively onto the backbone.

The hydrophobic backbone of the copolymer according to the invention consists of a rigid, cross-linked polymeric substance having a porous structure with virtually no affinity for water.

Examples which may be mentioned in particular of crosslinked polymeric substances suitable for the purposes of the invention are polystyrene crosslinked by block copolymerization with divinylbenzene, and methacrylic acid polymers polymerized by an anionic mechanism and crosslinked with, for example, ethylene dimethacrylate.

It will be noted that, in general, the crosslinking agent for the polymeric substance is a diunsaturated monomer such as divinylbenzene or a polymethylene dimethacrylate, for example ethylene dimethacrylate.

The hydrophilic chains of the copolymer according to the invention are fixed to the hydrophobic backbone by grafting through carbanionic initiation by means of the diunsaturated monomer which is the crosslinking agent for the polymeric substance.

These hydrophilic chains are polymers which are advantageously formed in situ, such as, for example, polyoxirane.

The invention will now be described in greater detail with reference to the copolymer system polystyrene/polyoxirane, without thereby restricting its scope.

In this particular case, the hydrophobic backbone consists of polystyrene crosslinked by divinylbenzene, to which hydrophilic polyoxirane chains are then fixed.

The process for the preparation of this polystyrene/polyoxirane copolymer consists in:

(1) crosslinking an $\alpha,\omega$-dicarbanionic polystyrene with a diunsaturated monomer such as divinylbenzene, (2) introducing oxirane into the swollen crosslinked polystyrene and (3) allowing the oxirane to polymerize, for example by raising the temperature of the reaction medium formed in this way, after the oxirane has diffused through the crosslinked polystyrene.

Dicarbanionic "living" polystyrene of a given molecular weight is obtained by reacting styrene, at low temperature, in a suitable solvent such as tetrahydrofuran, with a dianionic initiator, for example the dipotassium derivative of $\alpha$-methylstyrene tetramer.

A small quantity of the diunsaturated monomer, divinylbenzene, is then added at low temperature, with thorough stirring, to the resulting solution of the "living" polymer. The carbanionic sites of the polystyrene act as initiators for the polymerization of the divinylbenzene, leading to the formation of a three-dimensional network in which the linear chains of the polystyrene constitute the elastic chains. The average molecular weight of these elastic chains is advantageously between 1000 and 500,000 g/mol. In this three-dimensional network, each branch point is a nodule of polydivinylbenzene linked to p chain-ends of the polystyrene precursor which contributed to the initiation of the latter. The anionic active sites have not been destroyed and are now located on the nodules of polydivinylbenzene (DVB). These sites are used to graft the hydrophilic chains.

Oxirane is then introduced into the swollen "living" network and allowed to diffuse slowly at low temperature. The oxirane reacts with the carbanionic sites to form alkoxy groups. When the oxirane is uniformly distributed in the network of swollen polystyrene, the oxirane is polymerized. This polymerization is advantageously effected by an appropriate increase in the temperature of the reaction medium up to 25° C.

The polyoxirane chains obtained are thus linked to the branch points of the polystyrene network, i.e. the polydivinylbenzene nodules. Each chain is linked by one end to the polystyrene network, the other end remaining free. The active sites are the protonated when the polymerization of the oxirane is complete. FIG. 1 attached is a simplified representation of the copolymer according to the invention.

The quantity and chain length of the polyoxirane in the crosslinked copolymer according to the invention can vary; they depend both on the number on active sites formed in the hydrophobic backbone and of the quantity of oxirane used.

The resulting crosslinked copolymer is then swollen in excess solvent and the soluble constituents are carefully extracted with tetrahydrofuran, the said constituents being mainly polyoxirane.

When the above process was carried out using polystyrene having a weight-average molecular weight of 50,000 g/mol and a number-average molecular weight of 43,000 g/mol, divinylbenzene at a rate of 15 molecules per carbanionic chain-end and oxirane at a rate of 40% by weight of the quantity of styrene used, a styrene/polyoxirane copolymer having a three-dimensional network was obtained, the characteristics of which are given below; assuming that each carbanionic site initially present in the crosslinked system permits the formation of one pendent polyoxirane chain, it is possible to calculate an approximate value for the average molecular weight of these chains.

| elemental analysis: | C % 80.08 H % 8.14 O % 11.82 |
|---|---|
| percentage by weight of the polyoxirane fraction: | 32.54% (by weight) |
| average molecular weight of the starting polystyrene (determined by GPC): | $\overline{M}_w$ = 50,000 g/mol, $\overline{M}_n$ = 43,000 g/mol |
| calculated average molecular weight of the polyoxirane: | $\overline{M}_n$ = 11,300 g/mol |
| swelling ratio at equilibrium: | in THF Q = 26.6 in water Q = 5.8 |

Determination of the swelling ratio

After it has been freed of the extractable constituents, the gel consisting of the copolymer according to the invention is subjected to equilibrium swelling measurements according to the technique described by P. WEISS, J. HERZ and P. REMPP, Makromol. Chem. 141, 145 (1971). The swelling ratios observed in tetrahydrofuran are relatively high and compatible with the values expected for networks having elastic chains with a number-average molecular weight of 50,000 g/mol.

Once it has been dried, the gel is no longer capable of swelling in water because the polystyrene phase is then well below its glass transition temperature and its amorphous rigid structure does not allow the water access to the grafted hydrophilic chains which this phase contains. However, when the gel is swollen in THF, this solvent acts as a plasticizer and a gradual solvent exchange between the THF and the water can be carried out successfully.

This solvent exchange must be continued until the initial swelling solvent has been completely removed, which causes partial deswelling of the crosslinked material.

For the particular copolymer defined above, the equilibrium swelling ratio in water amounts to one fifth of its initial value measured in THF.

The turbidity observed originates from the phase separation between the two constituents of the network. Consequently, the pore volume of this network which is accessible to water is far from negligible, despite the fact that the "effective" structure of the three-dimensional network, consisting of the copolymer of the invention, is essentially hydrophobic.

The crosslinked copolymers according to the invention are particularly suitable as filling materials for size exclusion chromatography columns. In this field of application, it is essential for the glass transition temperature, Tg, of the hydrophobic part to be substantially higher than the temperature at which the chromatography column is used.

Application of the copolymers of the invention to size exclusion chromatography

Before it can be used as a filling for a chromatography column, the crosslinked copolymer according to the invention must be reduced to fine particles; this reduction to fine particles is advantageously carried out in excess THF using a high-speed mixer. The resulting suspension of gel in THF is then poured into a large excess of methanol, with thorough stirring, after which the material is filtered off, washed with methanol and dried in vacuo at 50° C.

The dry particles of gel are then passed through a sieve and those with a size of between 100 and 200 μm are selected for the chromatography experiments below.

As indicated above, the particles of the crosslinked copolymer according to the invention cannot be reswollen directly in water.

They must first be swollen in THF and this solvent is then gradually replaced with water, as indicated above for the determination of the swelling ratio.

The gel, swollen in water by this method, is then introduced into a column (length 60 cm and diameter 0.8 cm) equipped at its bottom end with a sintered copper filter and a porous "Teflon" plate. To ensure uniform filling, the gel is suspended in a saline solution of the same apparent density. The column is then connected to a GPC apparatus and water is passed through it, initially at a very low rate and then under an operating pressure which is increased gradually up to about 20 bar to enable the gel to settle efficiently, and filling of the column is then completed. The column is again connected to the GPC apparatus and water is pumped through it under a pressure of 20 bar for 24 hours. This operation makes it possible to remove all the sodium chloride initially present and to test the mechanical strength of the filling.

The suitability of these gels for chromatographic separation in an aqueous medium was tested using standard polyoxiranes of low polydispersity, having molecular weights of between 270 g/mol and 27,500 g/mol. Ethylene glycol was also used as a calibration sample of low molecular weight. The pressure chosen was 70 bar and the flow rate was 1.5 ml/minute.

The elution curves obtained under these operating conditions are totally reproducible and show a well-defined maximum, as can be seen in FIG. 2, which is an example of one of these elution curves where the abscissa represents the volume eluted in ml (or the time in minutes) and the ordinate represents the variation δn, corresponding to detection by refractometry, which is proportional to the concentration of the eluate.

The table below indicates the molecular weight $\overline{M}_n$ of the polyoxiranes with the retention times observed in each case.

FIG. 3 shows the molecular weight (g/mol) (on a logarithmic scale) as a function of the elution volume. The points obtained are located on a well-defined characteristic elution curve comparable in all respects to those observed in the case of polymers eluted with organic solvents. In this practical example, it will be noted that the selectivity range of this particular gel, for the column chosen and under the experimental conditions used, extends from 100 g/mol to 5000 g/mol.

Despite the high pressures used with the gel according to the invention, it was not found to have any tendency to clog.

TABLE

| Sample | Molecular weight g/mol | Retention time minutes |
| --- | --- | --- |
| Polyoxirane | 27,000 | 10.3 |
| Polyoxirane | 6,000 | 10.3 |
| Polyoxirane | 3,900 | 10.5 |
| Polyoxirane | 2,000 | 12.1 |
| Polyoxirane | 1,500 | 12.75 |
| Polyoxirane | 1,000 | 13.75 |
| Polyoxirane | 640 | 15.2 |
| Polyoxirane | 270 | 17.2 |
| Ethylene glycol | 62 | 18.8 |

What is claimed is:

1. A partially hydrophilic, non-ionic crosslinked copolymer having a three-dimensional network, which consists essentially of a crosslinked hydrophobic backbone of polystyrene having a high mechanical strength and of non-ionic hydrophilic chains of polyoxirane grafted selectively onto said backbone, the grafting of the hydrophilic non-ionic chains onto the hydrophobic backbone of the copolymer being achieved by carbanionic initiation with divinylbenzene.

2. A process for the preparation of the copolymer according to claim 1 comprising:
   (a) crosslinking an α, ω-dicarbanionic polystyrene with divinylbenzene,
   (b) introducing oxirane into the swollen crosslinked polystyrene and
   (c) diffusing said oxirane throughout said crosslinked polystyrene and polymerizing said oxirane in situ.

3. A process according to claim 2, wherein said oxirane is diffused slowly at low temperature and polymerization is effected by increasing the temperature of the reaction medium up to 25° C.

4. A process according to claim 2, wherein said oxirane is uniformly distributed in the network of the crosslinked polystyrene.

* * * * *